United States Patent [19]

Van Auken

[11] 4,214,932
[45] Jul. 29, 1980

[54] METHOD FOR MAKING COMPOSITE TUBULAR ELEMENTS

[75] Inventor: Richard L. Van Auken, Bridgewater, N.J.

[73] Assignee: Exxon Research & Engineering Co., Florham Park, N.J.

[21] Appl. No.: 39,781

[22] Filed: May 17, 1979

Related U.S. Application Data

[62] Division of Ser. No. 801,028, May 27, 1977.

[51] Int. Cl.² .................. B65H 81/06; F16L 9/14; F16L 9/16
[52] U.S. Cl. .................... 156/187; 138/141; 156/188; 156/215; 156/313; 273/DIG. 7; 273/DIG. 23; 428/36; 428/302; 428/902
[58] Field of Search .................. 156/215, 313, 54, 56, 156/187, 188; 428/36, 111, 294, 302, 367, 376, 398, 902, 251, 368, ; 64/1 S; 138/131, 141, DIG. 2; 273/80 R, 80 B, DIG. 7, DIG. 23

[56] References Cited

U.S. PATENT DOCUMENTS

| | | | |
|---|---|---|---|
| 3,166,319 | 1/1965 | Brilhart | 273/80 B |
| 3,457,962 | 7/1969 | Shobert | 273/80 R |
| 3,646,610 | 2/1972 | Jackson | 273/80 R |
| 3,666,598 | 5/1972 | Christie et al. | 156/188 X |
| 4,039,006 | 8/1977 | Inoue et al. | 428/36 X |

Primary Examiner—Michael G. Withyshyn
Attorney, Agent, or Firm—Joseph J. Dvorak

[57] ABSTRACT

A tubular composite structure for transmitting forces comprises a metal tubular core, preferably of aluminum, having a layer of structural metal adhesive on the exterior surface of the core. On top of the structural adhesive layer are alternating laminae of resin impregnated unidirectional reinforcing fibers, particularly carbon or graphite fibers, and of woven fiberglass, beginning with a layer of woven fiberglass followed by a lamina of resin impregnated continuous unidirectional reinforcing fibers and continuing in alternating fashion but ending with a final layer of resin impregnated continuous unidirectional reinforcing fibers, each successive layer of resin impregnated continuous unidirectional fibers having the fibers oriented at an angle of between about 5° to 12° with respect to the longitudinal axis of the metal tube and in opposite orientation with respect to the next preceding layer. The fibers in the woven fiberglass layer are oriented at 0° and 90° with respect to the longitudinal axis of the metal tubular core. Preferably the unidirectional continuous reinforcing fibers are carbon fibers and particularly graphite fibers having a Youngs modulus of elasticity of about $30 \times 10^6$ to about $50 \times 10^6$ psi and a tensile strength of about 300,000 to about 400,000 psi.

9 Claims, 5 Drawing Figures

U.S. Patent    Jul. 29, 1980    4,214,932
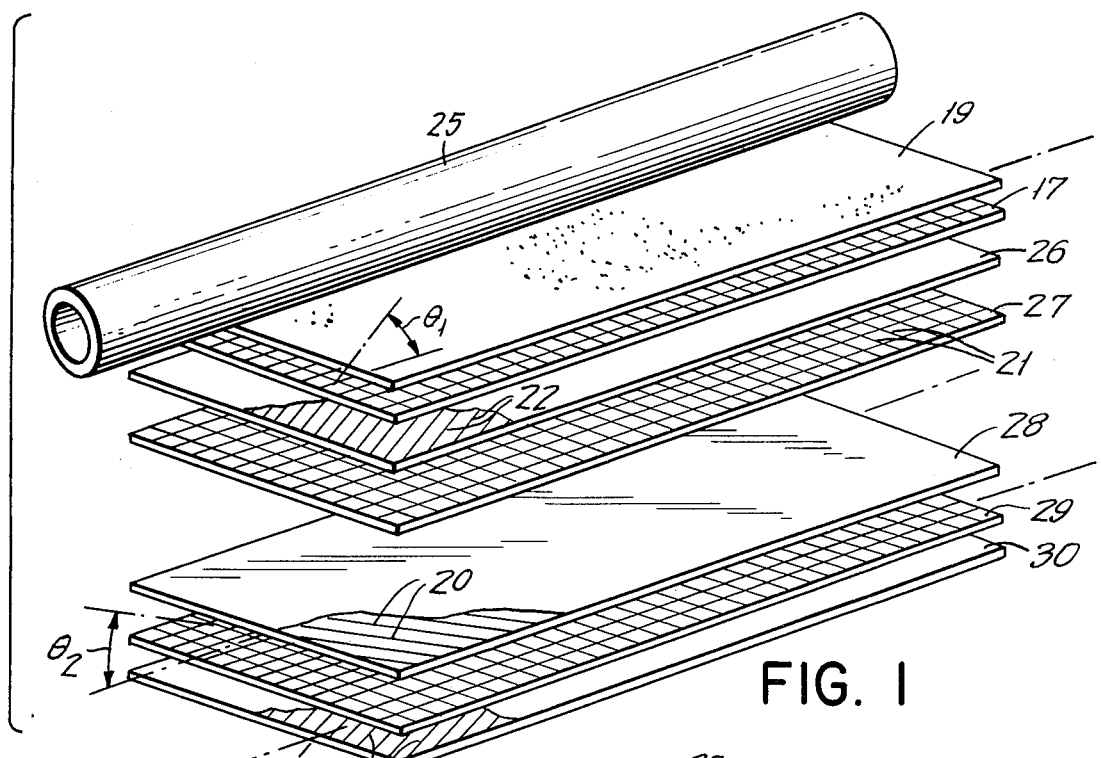
FIG. 1
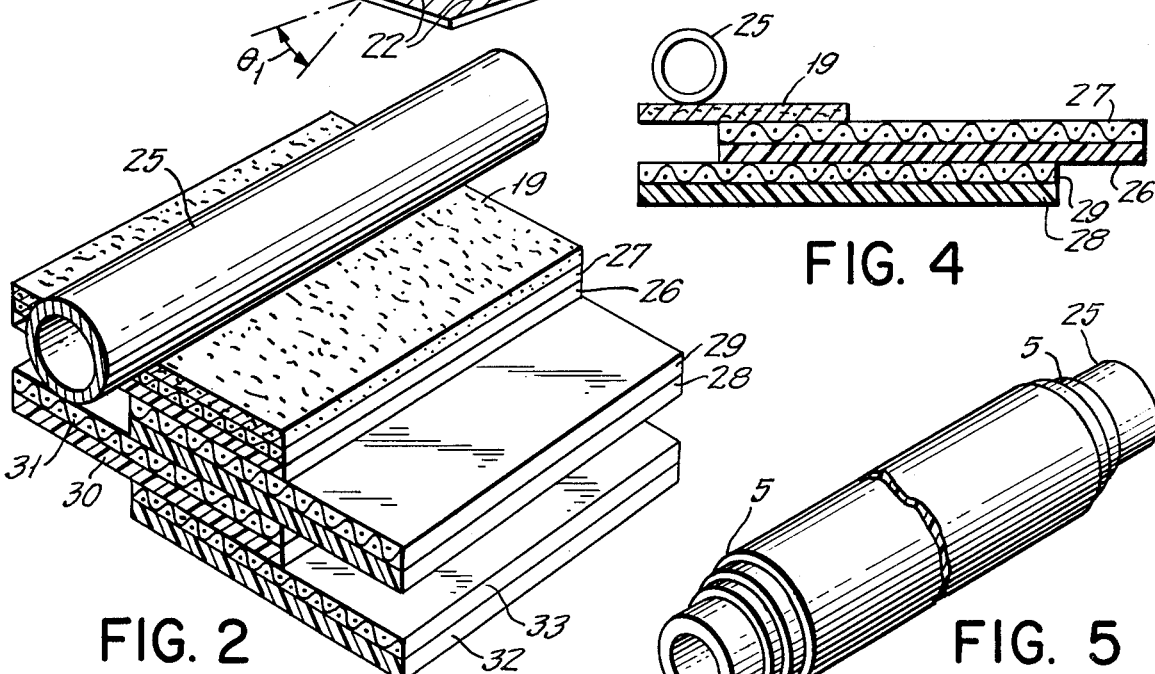
FIG. 2
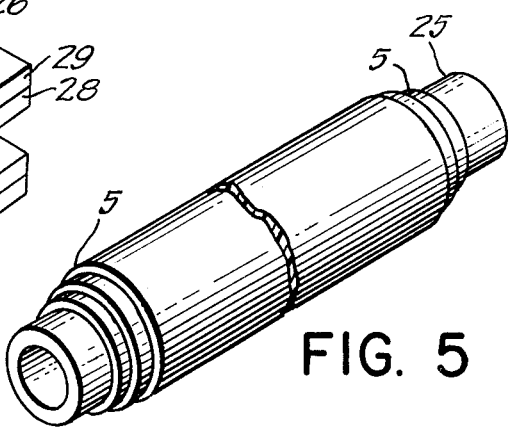
FIG. 4
FIG. 5
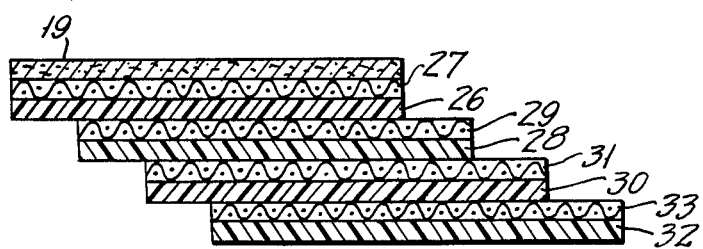
FIG. 3

METHOD FOR MAKING COMPOSITE TUBULAR ELEMENTS

This is a division of application Ser. No. 801,028, filed May 27, 1977.

BACKGROUND OF THE INVENTION

1. Field of the Invention

This invention relates to improved rotating elements. In particular, this invention relates to composite tubular elements for transmitting forces, and for sustaining axial and torque bearing forces.

2. Prior Art

Conventional rotating elements intended for transmission of forces of such rotor or drive shafts are generally made of metal, since these metal rotors or drive shafts are believed generally to possess great durability. As is well known, metal rotors or drive shafts, however, suffer from a number of disadvantages. For instance, it is impractical, if not impossible, to employ a single long metal drive shaft on a truck since, as the shaft is rotated, centrifugal forces act on the shaft mass. Consequently, any asymmetry in the shaft increases dramatically with an increase in the speed at which the shaft is rotated. The increased asymmetry causes the shaft to bend. Bending, however, is opposed by the elastic properties of the shaft metal, thereby resulting in a harmonic oscillation or vibration. The speed at which the amplitude of vibration is greatest, sometimes disastrously so, is referred to as the critical speed. For a long metal shaft for a truck, the critical speed is far too low for practical use.

In order to overcome the critical speed limitations of single long shafts, multiple sections of shafts are typically employed. Indeed, in the case of truck drive shafts, it is known to use up to four relatively short length solid metal cylindricals in the transmission chain, one connected to the other by means of universal joints and the like rather than a single length of rotor shaft. At each joint, bearings are required, as well as mounting brackets and the like. These multiple components not only increase the overall weight of the truck, but more importantly they tend to wear in use completely offsetting the great durability normally associated with metal rotational shafts.

Thus, the permissive circumferential speed of a rotor shaft is determined by its design and by the material employed in its construction. The design of a rotor or drive shaft of lighter weight and with greater axial stiffness would permit, of course, the application of such a shaft in higher critical speeds than presently possible with all metal shafts as presently constructed. In the past, some attempts have been made to design a lighter drive shaft. For example, it is known to reinforce metal tubes with helically wound filaments which are subsequently impregnated with a resin such as an epoxy resin, thereby forming a composite structure which has a metal portion and a plastic portion reinforced with continuous filament windings. Such composite structures, while capable of withstanding very high circumferential speeds, suffer from numerous disadvantages. For example, such helically wound rotors have inadequate axial stiffness for drive shaft applications.

Another difficulty associated with fiber reinforced resin coatings on tubular metal shafts is associated with the significant difference in the physical properties of the two essential materials, i.e. the metal and the fiber reinforced plastic. To get the requisite performance from the rotor or drive shaft, both materials must be combined in such a way as to operate harmoniously in absorbing and transmitting substantial torsion, tension and compression loads. Also, it is worth noting that durability tends to be a problem when bonding two dissimilar materials, such as plastic to metal. Consequently, there still remains a need for an improved rotor or drive shaft that will have the necessary strength and weight and load carrying ability and which can be economically prepared.

SUMMARY OF THE INVENTION

Generally speaking, the present invention provides an improved tubular composite for transmitting substantial torsion, tension and compression loads in which the axial loads primarily are borne by unidirectional reinforcing fiber filaments embedded in a resin matrix and the primary torque loads are borne by a metal tube, and in which composite structure the fibers are oriented at a predetermined angle of orientation so as to compensate for the significant differences in the physical properties of the fiber reinforced resin and metal tube, especially the significant differences in thermal coefficients of expansion of the metal tube and the fiber of the fiber reinforced resin.

Thus, in one embodiment of the present invention, there is provided a tubular composition structure for transmitting forces which comprises a metal tubular core, preferably of aluminum, having a layer of structural metal adhesive on the exterior surface of the core. On top of the structural adhesive layer are alternating laminae of resin impregnated unidirectional reinforcing fibers, particularly carbon or graphite fibers, and of woven fiberglass, beginning with a layer of woven fiberglass followed by a lamina of resin impregnated continuous unidirectional reinforcing fibers and continuing in alternating fashion but ending with a final layer of resin impregnated continuous unidirectional reinforcing fibers, each successive layer of resin impregnated continuous unidirectional fibers having the fibers oriented at an angle of between about 5° to 12° with respect to the longitudinal axis of the metal tube and in opposite orientation with respect to the next preceding layer. The fibers in the woven fiberglass layer are oriented at 0° and 90° with respect to the longitudinal axis of the metal tubular core. Preferably the unidirectional continuous reinforcing fibers are carbon fibers and particularly graphite fibers having a Youngs modulus of elasticity of about $30 \times 10^6$ to about $50 \times 10^6$ psi and a tensile strength of about 300,000 to about 400,000 psi.

These and other embodiments of the present invention will become readily apparent upon reading of the Detailed Description which follows in conjunction with the drawings.

BRIEF DESCRIPTION OF THE DRAWINGS

FIG. 1 is an isometric drawing, partly in perspective and partly cut away, showing the relationship of the alternating sheets of glass fibers and unidirectional resin impregnated fiber reinforcing layers to the metal core.

FIG. 2 is an end view, partly in perspective and greatly exaggerated showing the relationship of the alternating sheets of glass fibers and unidirectional resin impregnated reinforcing fibers arranged to be rolled on the tubular metal core to form a shaft for transmitting forces in accordance with the present invention.

FIG. 3 is an exaggerated view showing still another alternate arrangement of glass fibers and unidirectional resin impregnated reinforcing fibers.

FIG. 4 is an exaggerated end view showing an alternate arrangement of glass fibers and unidirectional resin impregnated reinforcing fibers.

FIG. 5 is a view partly in perspective of a composite shaft having a core longer than the reinforcing fiber layer.

DETAILED DESCRIPTION OF THE INVENTION

Referring now to the drawings, it should be noted that like reference characters designate corresponding parts throughout the several drawings and views.

The drive shaft of the present invention has a metal core 25 in the form of a cylindrical hollow tube as is shown in FIGS. 1 and 2. In order that the drive shaft will have the requisite strength and weight, it is preferred that the metal tube be fabricated from aluminum or magnesium alloys. Indeed, it is particularly preferred that core 25 be fabricated from the following aluminum alloys: 2024, 7075, 7078 and 6061. The foregoing numerical designations refer, of course, to U.S. alloy compositions. It is particularly preferred that these alloys have a T-6 temper. Aluminum alloys having the foregoing compositions and temper are articles of trade readily available and can be shaped into tubular articles by standard techniques, such as drawing or extruding heavy walled cylindrical billets to the required dimensions.

In fabricating the composite tubular element of the present invention, it is important that the metal core 25 be completely clean. To avoid any possible surface contaminants, the final cleaning of the metal core 25 generally is made with a material such as alcohol or chlorofluorocarbons to remove traces of lubricants, grease, etc.

The metal core 25 of the present invention is encased in a sheath of resin impregnated continuous unidirectional reinforcing fibers and glass fiber which is bonded to core 25 so that it is substantially integral therewith. This sheath of resin impregnated fiber material is actually fabricated from various layers of material and indeed at least two layers of fiber reinforced resin which are ultimately bonded one to the other by curing of the resin contained therein.

In fabricating the composite tubular element, a generally quadrangular, and preferably rectangular, sheet such as lamina 26 is cut from a sheet of unidirectional continuous fiber reinforcing fibers impregnated with a plastic resin and which fibers are preferably carbon or graphite fibers and which fibers will for convenience be hereinafter referred to as graphite fibers. As is shown in the figures, this lamina 26 is cut with a length preferably slightly longer than the axial length of the reinforcing layer in the final composite tubular element. The reason for this slight oversizing is for ease of manufacture which will become apparent upon a further reading of this detailed description. The width of the rectangular fiber impregnated sheet material 26 preferably is equal to at least about twice the circumference of the metal core 25. In other words, the width of the fiber reinforced resin impregnated graphite fibers should be sufficient that it can be completely wrapped around the circumference of the metal core 25 at least two times. The width of the fiber impregnated sheet material can be greater; however, it is especially important that it is sized to provide only full wraps and not fractional wraps which would make the shaft unbalanced.

The resin material impregnating the graphite fibers 22 of the quadrangular sheet 26 is a thermosetting resin. Suitable thermosetting resins include epoxy and polyester resins.

The epoxy resins are polyepoxides which are well known condensation products or compounds containing oxirane rings with compounds containing hydroxyl groups or active hydrogen atoms such as amines, acids and aldehydes. The most common epoxy resin compounds are those of epichlorohydrin and bis-phenol and its homologs.

The polyester resin is a polycondensation product of polybasic acids with polyhydric alcohols. Typical polyesters include polyterephthalates such as poly(ethyleneterephthalate).

As is well known to the art, these thermoset resins include modifying agents such as hardeners and the like. Forming such compounds is not a part of the present invention. Indeed, the preferred modified epoxy resin impregnated graphite fibers are commercially available materials; for example, modified epoxy pre-impregnated graphite fibers are sold under the name of Rigidite 5209 and Rigidite 5213 by the Narmco Division of Celanese Corporation, New York, NY. Other commercial sources of resin pre-impregnated graphite fibers are known in the industry.

In general, the resin impregnated quadrangular sheet 26 will have a thickness of about 0.007 to 0.01 inches and contain from about 50 volume % to about 60 volume % of graphite fibers in the thermoset resin matrix. Preferably the quadrangular sheet 26 used in the present invention has 54 volume % of 58 volume % of continuous unidirectional graphite fibers in an epoxy resin matrix. Indeed, it is especially preferred that the graphite fibers have a Youngs modulus of elasticity in the range of $30 \times 10^6$ to $50 \times 10^6$ psi and a tensile strength in the range of about 300,000 to about 400,000 psi.

Returning again to the drawings, a woven glass fabric layer designated generally as 27 also is provided. This quadrangular sheet 27 has the same dimensions as sheet 26. The quadrangular sheet of woven fiberglass will have a thickness of about 0.001 to about 0.002 inches and will consist of woven glass fabric, preferably a fiberglass fabric known in the trade as fiberglass scrim. An especially useful fiberglass scrim is Style 107 sold by Burlington Glass Fabrics Company, New York, NY. As can be seen, the fibers 21 of the woven fiberglass fabric are at angles of 0° to 90° with respect to the major axis of the quadrangular sheet material.

As can be seen in the cut-out of FIG. 1, the unidirectional graphite fibers 22 in quadrangular sheet 26 are oriented at a specific predetermined angle, $\theta_1$, with respect to the major axis of first layer 26. In the next layer of resin impregnated unidirectional continuous graphite fibers, i.e. layer 28, the unidirectional graphite fibers 20 are oriented at a negative predetermined specific angle, $\theta_2$, with respect to the major axis of the second layer 28. Such angle is preferably of the same dimension and, of course, opposite sign of the angle of orientation of the fibers in the first layer 26.

In fabricating the composite shaft, a multiplicity of layers of resin impregnated continuous graphite fibers and woven fiberglass are cut from stock material to the desired flat pattern. Each layer is cut to the same size and shape. As indicated above, the marginal edges along the minor axis of the quadrangular shaped material should be sufficiently wide to accommodate at least two complete turns about the tubular metal core 25. Also, as indicated previously, the major axis generally would be determined by the desired length of the shaft, and preferably the major axis is slightly longer in length than the longitudinal length of the ultimate composite tubular element.

The various layers of sheet material are arranged in alternating sequence starting, for example, with a bottom layer of resin impregnated graphite fibers followed by a layer of fiberglass, followed still by another layer of resin impregnated graphite fibers, which in turn is followed by another layer of fiberglass. In FIG. 1, for example, there is provided glass layers 17, 27 and 29, and graphite fiber layers 26, 28 and 30 in alternating sequence.

In each successive lamina of resin impregnated unidirectional reinforcing fibers, however, it should be noted that the reinforcing fibers are oriented at a predetermined angle of orientation with respect to the major axis of that layer. Generally, this angle of orientation will range between about 8° to about 12° and preferably this angle of orientation will be about 10°. It is particularly preferred that the angle of orientation of the graphite fibers in each succeeding layer of resin impregnated graphite sheet material be of the same magnitude but opposite orientation from the next preceding layer. Thus, with reference to FIG. 1, fibers 22 in sheet 26 are seen being oriented at an angle, $\theta_1$, and fibers 20 of sheet material 28 are oriented at an angle, $\theta_2$, with respect to the length of the quadrangular sheet material. In sheet 30 the fibers 22 are oriented at an angle, $\theta_1$, with respect to the longitudinal axis of the tubular core. In all instances, however, the magnitude of $\theta_1$ and $\theta_2$ are the same and they are merely opposite in sign.

In arranging the individual lamina cut to the predetermined flat pattern, it is particularly preferred to form a ply of sheet material consisting of a layer of resin impregnated graphite fiber lamina having a woven fiberglass lamina on top of the graphite laminae. Then, the plies are placed on top of the other. Each successive ply, however, is set back from the leading edge of the preceding ply in an amount equal to about ½ the diameter of the core. Thus, in FIG. 1, an outer layer of resin impregnated graphite fiber 30 is followed by glass layer 29, graphite layer 28, glass layer 27, graphite layer 26 and glass layer 17.

As can be seen in the arrangement of FIG. 2, the first ply comprises a layer of resin impregnated graphite fiber sheet material 32 on which is superimposed a fiberglass layer 33. A second ply is provided comprising a layer of graphite resin impregnated sheet material 30 on which is superimposed a fiberglass sheet material 31. The second ply, however, is set back approximately a distance equal to approximately ½ the diameter of the core 25. A third ply, comprising a sheet of resin impregnated graphite fibers 28 on which is superimposed a layer of woven fiberglass 29, is positioned to substantially correspond with the first ply. The fourth ply comprising a sheet of resin impregnated graphite fiber 26 is superimposed over fiberglass layer 27 and this ply of sheet material is set back from the marginal edge of the third ply in the same manner as the second ply of material. Thus, alternating plies, comprising graphite fibers and glass fibers, are set back from the longitudinal or major edge of the rectangular sheet.

In FIG. 4 is shown still another and especially preferred arrangement of glass fibers and resin impregnated fibers. In this embodiment, the first ply consists of a layer of resin impregnated graphite fiber sheet material 28 on which is placed a sheet of woven fiberglass scrim 29. Next is provided a layer of resin impregnated graphite fiber 26 and woven fiberglass scrim 27. In this embodiment, the width of sheets 26, 27, 28 and 29 are sufficient to provide more than two full wraps around core 25. Also provided is layer 19 of sufficient width to provide one full wrap around core 25.

Layer 19 as shown in FIGS. 1 to 4 is a metal adhesive layer. It is particularly important in the practice of the present invention that a metal adhesive layer be employed to bond the resin of the resin impregnated sheet material to the tubular core 25. The metal adhesive material employed in the practice of the present invention is one typically employed for bonding plastics to metals, such as elastomeric modified epoxy and elastomeric modified phenolurea type resins. An example of one type of adhesive is polysulfide elastomer modified epichlorohydrin-bis-phenol resin. Many structural adhesives are commercially available, one of which is known as Metalbond 1133 which is an elastomer modified epoxy material sold by the Narmco Division of Celanese Corporation, New York, NY. Another is FM 123-2 sold by American Cyanamid, Wayne, NJ. The structural metal adhesive can be applied to the top side of the fiberglass sheet material such as 17 of FIG. 1 by means of brushing or spraying, for example, if the physical consistency of the adhesive permits, so as to cover the entire top surface of the sheet. It can also be brushed or sprayed, for example, on the circumference of the metal core 25. In the practice of the present invention, it is particularly preferred to employ an adhesive in the form of a thin film of sheet material such as sheet material 19 shown in FIGS. 1 to 4. This sheet material will be cut to the same dimensions and predetermined pattern as layer 26, for example, or it can be cut to provide one full wrap around core 25 as explained in conjunction with FIG. 5.

Additionally, it has been found to be particularly advantageous to also apply, by brushing or spraying, a solution of the same adhesive used in layer 19 to the exterior of the metal core 25 after the metal core has been adequately cleaned.

In general, the weight of structural metal adhesive layer employed in the practice of the present invention should be kept in the range of about 0.020 to 0.040 lb/ft², and, indeed, it is particularly preferred that the weight of adhesive layer 19 be kept to about 0.030 lb/ft². Apparently the amount of adhesive that is applied is important in assuring not only the proper bonding of the plastic resin to the metal core but also assuring the cooperation of the torsional rigidity of the metal tubing with the longitudinal stiffness of the graphite fiber reinforcement.

In any event, an oblong sheet of laminated material consisting of a structural adhesive layer 19, resin impregnated graphite fiber layers and glass fabric and a multiplicity of fiber layers are wound around the circumference of metal core 25. It should be noted, of course, that the adhesive layer is placed in contact with the tubular metal core 25 and that the continuous unidirectional graphite fibers are arranged at angles between ±5° to ±12° with respect to the longitudinal axis of the metal core whereas the woven fiberglass layers are arranged at angles of 0° and 90° with respect to the longitudinal axis of the metal core 25. In wrapping the laminated structure around metal tube core, it is particularly preferred that there be very little, if any, overlap. After wrapping the metal core with the requisite layers of material, these materials can be held in place by means of cellophane tape, for example. Alternatively, the assembly of core and external resin impregnated graphite fiber reinforcing material can be held in place by a wrapping of a polypropylene heat shrinkable film (not shown) which serves, in effect, as the mold and which is subsequently removed as hereinafter described.

After wrapping the metal core with the requisite number of layers of material, the assembly is placed in an oven and heated to a temperature sufficient to cause a bonding of the separate layers in the various convolutions to each other. The temperature at which the assembly is heated depends upon a number of factors including the resin which is used to impregnate the graphite fibers. These temperatures are well known. Typically for a modified epoxy resin impregnated graphite fiber the temperature will be in the range of about 100° C. to about 180° C. and preferably about 140° C.

If an external polypropylene wrapping film is used to hold the various layers around the metal core, this can be removed very simply by manually peeling it away from the surface of the shaft. Surface imperfections, if there are any on the shaft, can be removed by sanding or grinding or the like. If so desired, the shaft can be painted.

In those instances where particularly heavy wall thickness of fiberglass scrim and resin impregnated graphite fibers are to be built up on the tubular core 25, after wrapping the core with a number of the multiple layers and heating the assembly in an oven, additional wrappings of glass and resin impregnated fiber may be wrapped on the previously cured assembly. This new assembly can be heated and cured in the same manner as the original wrappings. This procedure can be repeated as many times as is necessary to get the requisite coating on the core.

In view of the fact that it is not always possible to get a perfectly flat butt edge in the composite tubular material, as indicated before it is generally preferable to use a laminated sheet material which is slightly larger than the requisite length of the ultimate composite tubular element. In this way, any rounded shoulder such as shoulder 5 shown in FIG. 5 can be eliminated merely by making a radial cut through the tube behind the shoulder, thereby providing a perfectly straight butt edge, if this is required for the composite tubular element.

The application has been described with particular reference to composite shafts for transmitting substantial torsion, tension and compression loads, irrespective of the application for such shafts.

To further illustrate the present invention, reference now is herein made to a typical composite shaft for a truck. In such application the metal core 25 typically will be in the range of 8 to 10 feet long and have an I.D. in the range of 2¾" to 4½" and an O.D. in the range of 3" to 5". The shaft will have a layer of structural metal adhesive in the range of about 0.020 to 0.040 lb/ft². On top of the structural adhesive layer will be bonded thereto 2 to 10 plies of fiberglass scrim and the epoxy impregnated unidirectional continuous graphite fiber sheet material, each ply consisting of a layer of scrim and a layer of the fiber sheet material. The orientation of the woven glass fiber layers will be at 0° to 90° with respect to the longitudinal axis of the shaft and the orientation of the continuous graphite fibers. Each succeeding layer of graphite fiber will be about 10° but in opposite direction from the next preceding layer. Thus, the graphite fiber is said to be oriented at ±10° with respect to the longitudinal axis.

In contrast thereto, for a typical standard size automobile, a composite drive shaft of the present invention would have an aluminum core having a length of between about 40" to 72" and an O.D. between 2½" to 3" and an I.D. of between 2¼" to 2¾". Such composite drive shaft would have 2 to 10 plies of woven fiberglass and continuous unidirectional graphite fibers impregnated with an epoxy resin, each ply consisting of a layer of fiberglass and a layer of the resin impregnated fibers. As with the drive shaft for the truck, the graphite fibers are oriented at ±10° with respect to the longitudinal axis of the shaft. Additionally, the shaft will have interposed between the metal core and the reinforcing layer a layer of structural metal adhesive.

As indicated hereinabove, one of the difficulties associated with forming a composite tubular element for the transmittal of axial compressive and torque loads is that there is a vast difference in the physical properties of the metal core and the fiber reinforced resin layer such that each resin layer tends to operate in opposition to the other. The present invention is predicated on the discovery that the two very different materials in the composite can be made to cooperate one with the other and to act in harmony, thereby providing a vastly improved rotor or shaft which has light weight and great strength. The key to this cooperation resides in two very important features: (a) the proper orientation of the graphite fiber and glass in the reinforced material, and (b) the layer of structural metal adhesive between the metal core and the continuous graphite fiber reinforced layer.

As should be appreciated, a broad latitude in modification and substitution is intended in the foregoing disclosure. Accordingly, it is appropriate that the appended claims be construed broadly and in a manner consistent with the spirit and scope of the invention herein.

What is claimed is:

1. A method for fabricating a composite tubular shaft for transmitting forces and for sustaining axial and torque bearing forces, said shaft having a tubular metal core encased in a sheath of fiber reinforced resin, said method comprising:

coating the periphery of said tubular core with a structural metal adhesive in an amount ranging from about 0.020 to 0.040 lb/ft²;

forming a plurality of quadrangular laminated plies of sheet material having a length greater than the width and having a first woven fiberglass cloth layer and a second resin impregnated continuous unidirectional reinforcing fiber layer, said sheet material having a width at least twice the diameter of said core and only in whole multiples thereof, the fibers in said fiberglass cloth layer oriented at about 0° and about 90° with respect to the length of said sheet material, and the continuous fibers in said reinforcing fiber layer being oriented at an angle of 5° to about 12° with respect to the length of said sheet material;

arranging each successive ply with respect to the preceding ply so that the continuous fibers in each reinforcing fiber layer are in opposite directional orientation with respect to the continuous fibers in the reinforcing fiber layer of the preceding ply;

wrapping the so arranged plies around the adhesive coated core to form an assembly; and;

heating the assembly at a temperature sufficient to cause the resin to cure.

2. The method of claim 1 wherein said assembly is heated to a temperature in the range of from about 100° C. to about 180° C.

3. A method of forming a composite tubular shaft comprising:

forming a tubular metal core, said metal being selected from aluminum, aluminum alloys and magnesium;

coating said metal core with a structural metal adhesive in an amount ranging from 0.020 to 0.040 lb/ft$^2$;

forming a plurality of plies consisting of woven fiberglass scrim and resin impregnated unidirectional continuous reinforcing fiber sheet material, each said ply being rectangular in shape and having a width at least two times the diameter of the core and only in whole multiples thereof, the fibers in said fiberglass scrim being oriented at 0° and 90° with respect to the length of said rectangular shape and the continuous fibers in said fiber sheet material being oriented at between 5° to 12° with respect to the length of said rectangular shape;

wrapping said adhesive coated core with each of said plurality of plies of sheet material such that said continuous fibers in each succeeding ply are oriented at the same angle of between 5° to 12° with respect to the longitudinal axis of said core but in opposite direction from the preceding ply;

curing the so wrapped metal core.

4. The method of claim 3 wherein said resin is a thermoset resin and said continuous fibers are selected from carbon and graphite fibers.

5. The method of claim 4 wherein said thermoset resin is an epoxy resin.

6. The method of claim 5 wherein said continuous fibers are oriented at about 10° with respect to said longitudinal axis of said core.

7. The method of claim 6 wherein said plurality of plies ranges from about 2 plies to about 12 plies.

8. The method of claim 7 wherein said wrapped core is cured by heating at a temperature between about 100° C. to about 180° C.

9. The method of claim 7 wherein only some of said plurality of plies are wrapped on said core and the so wrapped core is cured to provide a subassembly and thereafter the remainder of said plurality of plies are wrapped on the subassembly and the so wrapped subassembly is cured by heating at a temperature in the range of between 100° C. and 180° C.

* * * * *